(12) United States Patent
Simmons et al.

(10) Patent No.: US 7,560,028 B1
(45) Date of Patent: Jul. 14, 2009

(54) COMPLEX ADMIXTURES OF CLATHRATE HYDRATES IN A WATER DESALINATION METHOD

(75) Inventors: Blake A. Simmons, San Francisco, CA (US); Robert W. Bradshaw, Livermore, CA (US); Daniel E. Dedrick, Berkeley, CA (US); David W. Anderson, Riverbank, CA (US)

(73) Assignee: Sandia Corporation, Livermore, CA (US)

( * ) Notice: Subject to any disclaimer, the term of this patent is extended or adjusted under 35 U.S.C. 154(b) by 458 days.

(21) Appl. No.: 11/489,306

(22) Filed: Jul. 18, 2006

(51) Int. Cl.
*C02F 1/44* (2006.01)
*C02F 1/469* (2006.01)

(52) U.S. Cl. .......................... 210/639; 62/536; 62/541; 205/747; 210/652; 210/711; 210/714; 210/737

(58) Field of Classification Search .................. 210/737
See application file for complete search history.

(56) References Cited

U.S. PATENT DOCUMENTS

| | | | | |
|---|---|---|---|---|
| 3,214,371 | A * | 10/1965 | Tuwiner | 62/532 |
| 3,856,492 | A * | 12/1974 | Klass | 62/533 |
| 4,207,351 | A * | 6/1980 | Davies | 426/387 |
| 5,302,297 | A | 4/1994 | Barthrope | 210/728 |
| 5,444,986 | A * | 8/1995 | Hino | 62/66 |
| 5,553,456 | A | 9/1996 | McCormack | 62/59 |
| 5,873,262 | A | 2/1999 | Max et al. | 62/532 |
| 6,158,239 | A | 12/2000 | Max et al. | 62/532 |
| 6,415,628 | B1 * | 7/2002 | Ahmed et al. | 62/534 |
| 6,890,444 | B1 | 5/2005 | Max | 210/737 |
| 2005/0082214 | A1 | 4/2005 | Max | 210/220 |
| 2005/0247640 | A1 | 11/2005 | Max et al. | 210/712 |

FOREIGN PATENT DOCUMENTS

WO WO0200553 1/2002

OTHER PUBLICATIONS

Warren, K. J.; and Greenfell, M. W..; "Perfluorocarbons for Specialized Cleaning Applications," *Precision Cleaning '95 Proceedings*, Witter Publishing Co., 1995, pp. 310-314.
McCormack, R. A.; and Anderson, R. K.; "Clathrate Desalination Plant Preliminary Research Study," *Water Treatment Technology Program Report No. 5*, U.S. Department of the Interior, Bureau of Reclamation, Jun. 1985, 94 pages.
McCormack, R. A.; Niblock, G. A.; "Investigation of High Freezing Temperature, Zero Ozone, and Zero Global Warming Potential Clathrate Formers for Desalination," *Water Desalination Research and Development Report No. 59*, U.S. Department of the Interior, Bureau of Reclamation, Jun. 2000, 69 pages.
Davidson, D. W.; Handa, Y. P., Ratcliffe, C. I.; and Tse, J. S.; "The ability of small molecules to form clathrate hydrates of structure II," *Nature*, 1984 v.311, pp. 142-143.
Miller, J. E.; "Review of Water Resources and Desalination Technologies," *SAND Report*, 2003, 54 pages.

* cited by examiner

Primary Examiner—Peter A Hruskoci
(74) Attorney, Agent, or Firm—Timothy P. Evans

(57) ABSTRACT

Disclosed is a method that achieves water desalination by utilizing and optimizing clathrate hydrate phenomena. Clathrate hydrates are crystalline compounds of gas and water that desalinate water by excluding salt molecules during crystallization. Contacting a hydrate forming gaseous species with water will spontaneously form hydrates at specific temperatures and pressures through the extraction of water molecules from the bulk phase followed by crystallite nucleation. Subsequent dissociation of pure hydrates yields fresh water and, if operated correctly, allows the hydrate-forming gas to be efficiently recycled into the process stream.

13 Claims, 6 Drawing Sheets

COMPLEX ADMIXTURES OF CLATHRATE HYDRATES IN A WATER DESALINATION METHOD

STATEMENT OF GOVERNMENT SUPPORT

The United States Government has a paid-up license in this invention and the right in limited circumstances to require the patent owner to license others on reasonable terms as provided for by the terms of contract No. DE-AC04-94AL85000 awarded by the U.S. Department of Energy to Sandia Corporation.

CROSS REFERENCE TO RELATED APPLICATIONS

None

BACKGROUND OF THE INVENTION

Field of the Invention

The invention pertains generally to desalination of ocean, marine, and brackish saltwater. More particularly, the invention relates to materials and a method for using those materials for removing dissolved mineral salts in a quantity of water.

The cheap and efficient production of plentiful fresh water is becoming increasingly critical, especially in areas where a ready source of potable water is unavailable. Moreover, this problem is only expected to grow worse as world populations increase and the apparent inevitability of global warming shifts precipitation patterns.

Original methods proposed for desalinating seawater involved distillation where the seawater is heated to boiling and water vapor is subsequently condensed to form fresh water. Desalination by distillation was followed by the use of reverse osmosis which involves diffusion of fresh water from seawater through a semipermeable membrane due to the high pressure applied to the seawater feed tank. Desalination by reverse osmosis and electrodialysis is considered to be limited in certain applications as compared to desalination by distillation primarily due to the cost of the semipermeable membranes and the high pressure pumps required, as well as certain limitations in the type of water that can be processed using these techniques.

Another process that has become important for large-scale seawater desalination is freezing by circulating a cold refrigerant through a heat exchanger to remove heat from the seawater. Ice is formed on the heat exchanger surface and is removed, washed and melted to produce fresh water. In the category of freeze desalination by direct freezing, where desalination is carried out by the vacuum freezing vapor compression process, heat is removed from seawater by direct contact with a refrigerant. In a secondary refrigerant mode of this process, a refrigerant that has low solubility in water is compressed, cooled to a temperature close to the freezing temperature of salt water and mixed with seawater. As the refrigerant evaporates, heat is absorbed from the mixture and water freezes into ice.

A variant of this process includes the formation of a gas or "clathrate" hydrate. Clathrate hydrates are a class of solids in which gas molecules occupy "cages" made up of hydrogen-bonded water molecules at temperatures higher than the freezing temperature of water. Clathrate hydrates are crystalline inclusion compounds of water and a gas that spontaneously occur at specific local conditions of temperature and pressure. There are three known crystalline (structure I, structure II, and structure H) motifs that these hydrates can possess. Each of these crystalline types contains cavities that are formed by the water molecules and physically trap the gas hydrate forming species within. These "guest" gas and/or liquid molecules are held in place within the hydrogen bonded molecular water lattice by Van der Waals forces. After a sufficient number of the host cavities are occupied (typically ~70-75%) a solid, thermodynamically stable, crystalline unit cell structure is formed. These hydrates are commonly referred to as gas hydrates and contain guest molecules that predominantly exist in the gas phase at standard temperature and pressure. The most common gas hydrate forming species is methane, but several other gases can also form hydrates, including carbon dioxide, hydrogen sulfide, ethane, ethylene, propane, 1,1-difluoroethane and various other hydrocarbon, chlorofluorocarbon ("CFC"), and fluorocarbon gases. There are also several liquids that are known to form hydrates, such as 1,1-dichloro-1-fluoroethane, acetone, 1,4-dioxine, and tetrahydrofuran.

When the gas hydrate is melted, fresh water and the hydrocarbon are recovered, thus simultaneously producing fresh water and the hydrate former, both of which can be recirculated and, in the case of the hydrate forming species, recycled. This approach has the advantage over other direct freezing processes in that the operating temperature is higher, thus reducing power requirements and economic cost when forming and melting the clathrate hydrates to produce potable water.

The concept of using clathrate hydrates to the field of desalination, therefore, is not new. There have been several programs that attempted various engineered solutions to harness this phenomenon, with the first beginning in the 1960s. The Bureau of Reclamation has recently commissioned work from Thermal Energy Storage, Inc., to explore the feasibility of this technology and the creation of two pilot plant facilities, one in Hawaii and a subsequent effort in San Diego.

Moreover, U.S. Pat. No. 5,553,456 to McCormack, discloses a clathrate freezing desalination system and method in which a clathrate forming agent is injected through a submerged pipeline to a predetermined ocean depth at which the surrounding ocean temperature is less than the clathrate forming temperature. The agent combines with the salt water to form a slurry of clathrate ice crystals and brine. The pipeline is concentric and coaxial with a surrounding outer pipeline in which the slurry is formed. The slurry is pumped back to the surface through the outer pipeline and the ice crystals are washed to remove brine. The washed crystals are then melted and the resultant water is separated from the clathrate forming agent, which may be discarded or recycled for re-injection through the inner pipeline. The melting of the clathrate ice as well as the cold water and air circulating in the desalination plant can be utilized as a source of air conditioning for local buildings and facilities.

However, the process recited by McCormack patent directly injects a hydrate forming hydrochlorofluorocarbon (hereinafter "HCFC") refrigerant into a pressurized tank of seawater at hydrate forming conditions (typically 100 psig and 40° F.). This unfortunately produces hydrate crystals which are small and dendritic in nature leading to a large amount of brine entrapped as a slurry in the interstitial spaces between hydrate crystals, from which the hydrates must be recovered and purified before disassociation. To solve this problem a filter was introduced to remove the smallest hydrate crystals, and a wash column used to remove the excess salt from the filtrate. This wash step produced hydrates with potable water quality, but it has also proved to be the largest detriment to overall process efficiency.

Therefore, before hydrate desalination is realized as a viable commercial technology, the complex and fundamental issues of controlled hydrate nucleation, hydrate size and morphology, agglomeration, amount of entrapped salt, and the efficient recovery of hydrates must be thoroughly and effectively solved and optimizations implemented.

What is needed, therefore, is a process for suppressing or preventing brine entrapment during the hydrate crystal nucleation/growth phase and thereby eliminating the need for a wash column, which would greatly enhance overall system efficiency.

SUMMARY

It is an object of this invention to purify polluted or brackish water.

It is also an object of this invention to form a purify seawater by the formation of a clathrate hydrate in seawater in the hydrate stability zone.

It is yet another object of this invention to desalinate seawater by forming an clathrate hydrate using a hydrochlorofluorocarbon compound, a hydrofluorocarbon compound, a chlorofluorocarbon compound, or mixtures thereof.

It is still another object of this invention to desalinate seawater using compounds such as 1,1-dichloro-1-fluoroethane, 1,1-fluoroethane, ethane.

It is yet another object of this invention to combine compounds such as 1,1-dichloro-1-fluoroethane, 1,1-fluoroethane, ethane with other species which under the appropriate formation conditions restrict or substantially eliminate the formation of hydrate crystal dendrites.

These and other objects of this invention are accomplished by a method of desalinating seawater by feeding polluted or brackish water into a lower zone of a body (vessel) containing a quantity of a hydrate forming species that has been solubilized in a heat exchange ("HX") liquid at a sufficient temperature and pressure to spontaneously form clathrate hydrates. Once formed, the hydrate will phase separate and/or partition in the liquid/liquid concentrated brine/HX liquid where it can be recovered, isolated, and allowed to dissociate into the hydrate forming species/HX solution and desalinated water and allowing recovery of both.

DETAILED DESCRIPTION OF THE EMBODIMENTS

We solve the problem of separating hydrates from interstitial salts and the necessity of using wash columns through the use of novel hydrate formers that would allow for high temperature hydrate formation and thus different nucleation environments. A wide variety of hydrate-forming substances are available that form hydrates at temperatures above the freezing point of water and a atmospheric or moderate pressure. Some examples are 1,1,1,2-tetrafluoroethane ($CF_3CH_2F$), carbon tetrafluoride ($CF_4$), and nitrogen trifluoride ($NF_3$) and HCFCs such as 1,1-dichloro-1-fluoroethane ($CH_3CCl_2F$) have been identified in the literature as promising candidates. We have conducted experiments to determine the impact that some of these hydrate formers have on the nucleation environment and the extent to which this environment can be tailored to produce hydrate crystals having low dendritic morphology. In particular, we have investigated using secondary liquids together with the hydrate formers to help inhibit dendrite growth in order to minimize interstitial salt entrapment.

Figure 1:
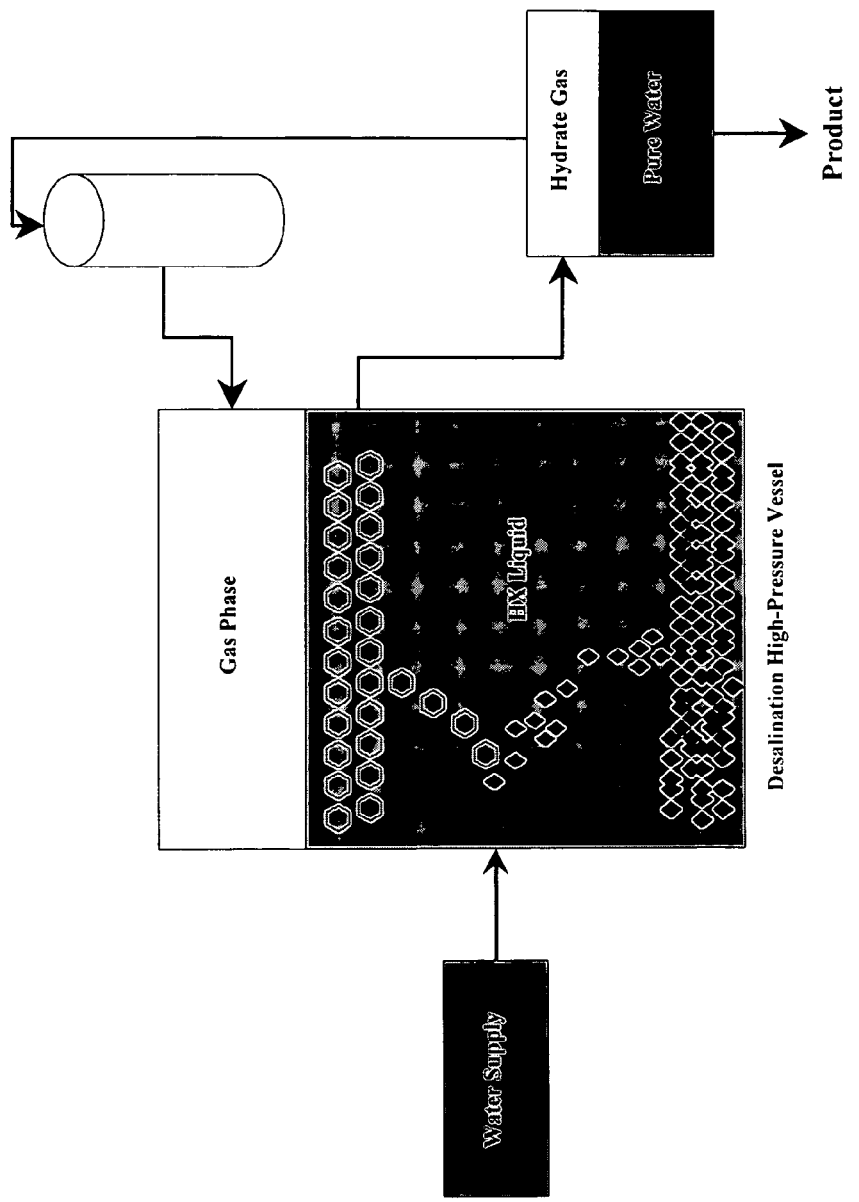
FIG. 1 is a schematic illustration of the general process for forming a clathrate hydrate in a supply of polluted or brackish water.
Figure 3:
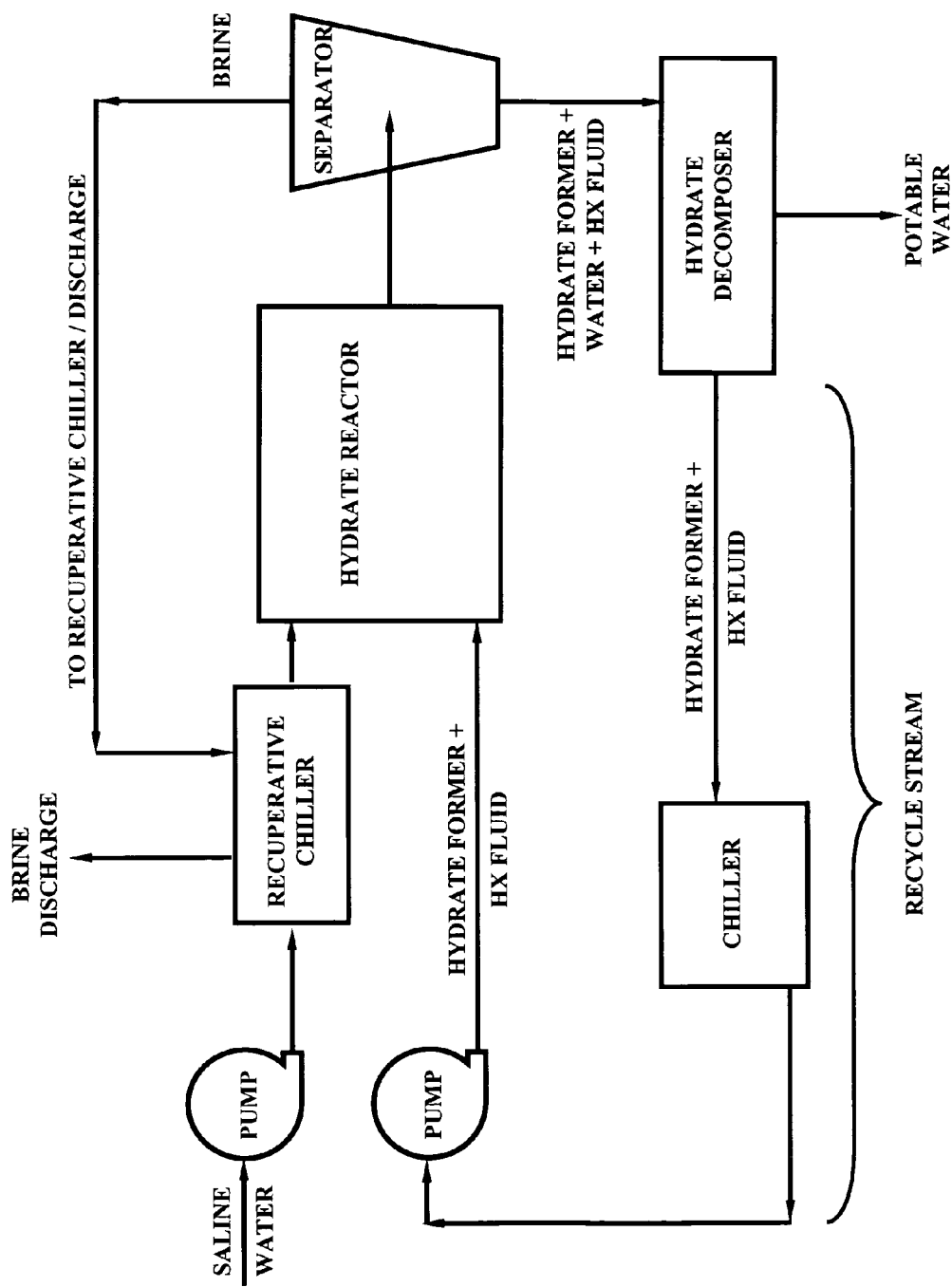
FIG. 3 is a schematic illustration of apparatus for forming a clathrate hydrate in polluted or brackish water in a continuous manner.

In particular, we formed hydrates by directly contacting the brine/contaminated water supply with gaseous hydrate forming species that are dissolved in a secondary inert fluid which serves to moderate hydrate growth and facilitate heat exchange. The criteria utilized for the selection of an inert heat exchange liquid are immiscibility with the selected water supply, will not itself form hydrates at the specified temperature and pressure, is non-toxic to humans, and will allow for a significant amount of the gaseous and/or liquid hydrate-forming species to be dissolved into it. Candidates for this heat exchange liquid include short and long chain non-polar alkanes, fluorocarbons, ionic liquids, supercritical carbon dioxide, and associated fatty acids. The liquid is placed in a vessel, sealed, and cooled to an appropriate hydrate-forming temperature by immersing it in a temperature controlled water or water/ethanol bath. The liquid is then pressurized to the corresponding hydrate forming conditions with the gaseous and/or liquid hydrate-forming species to ensure that saturation conditions exist in the liquid. A simplified schematic of this semi-continuous process is presented in FIG. 1. Another schematic of a continuous flow reactor design is presented in FIG. 3. Other embodiments of the reactor design and separation apparatus that facilitates liquid-solid-liquid separation will be known to those having skill in this art.

As noted above, several gaseous and liquid hydrate-forming species are possible. Initial species selected are chosen so that a single crystalline type of hydrate is formed. However, mixed gases and liquids are also possible that could result in mixed or singular crystalline phases. These hydrates can be either positively or negatively buoyant, depending on the specific gravity of the heat exchange ("HX") liquid and the chosen gaseous and liquid hydrate forming species. The salts in the water supply are excluded during the formation of the hydrate crystals and either precipitates out of solution, are concentrated in the remaining brine, or are freely disassociated in the HX liquid.

After the hydrates have formed and are separated, the inert liquid/hydrate mixture is pumped as a slurry to a separate chamber that will be at suitable temperature and pressure so that the hydrates will disassociate. The heat energy that is released during hydrate formation is conserved in the liquid and is the same as the heat of hydrate disassociation and results in a very energy efficient desalination process. After dissociation, the gaseous hydrate forming species will dissolve into the liquid and be recycled, and the water will phase separate from the liquid. The water is then be recovered and analyzed for any contaminants and ionic content. The cooled water stream may also be used in several applications and thus further increase the overall efficiency of the process.

EXAMPLE

Figure 2:
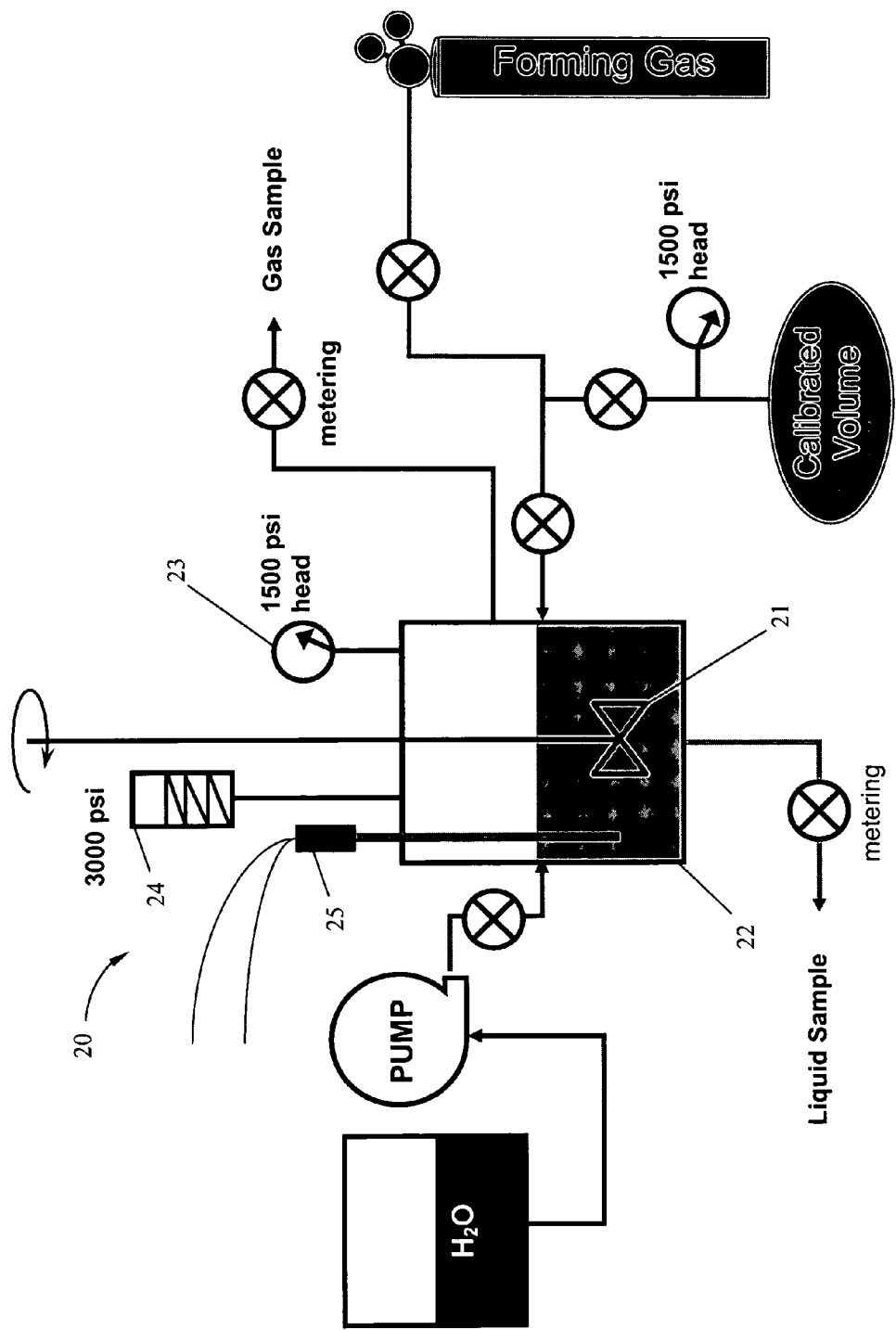
FIG. 2 is a schematic illustration of apparatus for forming a clathrate hydrate in polluted or brackish water in a semi-continuous manner.
Figure 4:
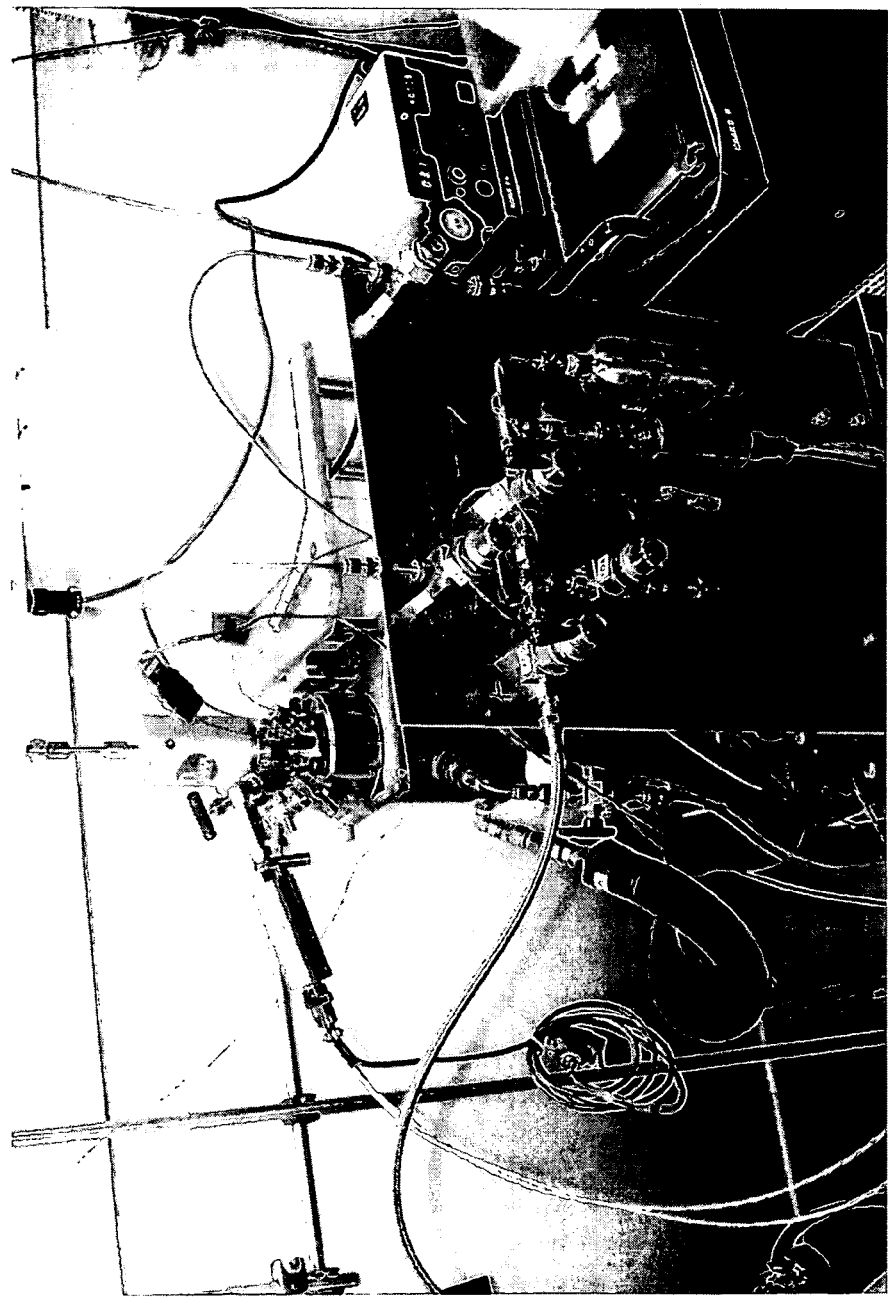
FIG. 4 is an illustration of the equipment used to prepare the clathrate hydrate in seawater.

A demonstration was conducted to show separation and recovery of water from saline solutions by formation and recovery of solid clathrate hydrates. A schematic diagram of the equipment used in this process is shown in FIG. 2 and a photograph of the actual test setup shown in FIGS. 4 and 5.

Hydrates were formed using a coolant solution using the HCFC refrigerant 1,1-dichloro-1-fluoroethane (hereinafter "R-141B") as the guest molecule and an inert secondary hydrocarbon heat exchange liquid which does not form hydrates. Moreover, R141B is completely miscible with perfluorinated liquid compounds, while neither of these components or their mixture is miscible with aqueous solutions. The preferred perfluorinated ("PFC") is an electronic liquid having a molecular weight of 521 gm/gm-mole, a density of 1.82 gm/cm$^3$, a refractive index of 1.2813, and a dielectric constant of 1.86 and is available from the 3M Company (St. Paul, Minn. 55144-1000) under the trade name FLUORINERT™ FC-3283 (hereinafter "FC-3283").

A coolant solution mixture comprising 25% by weight of R-141B and 75% by weight of FC-3283 was prepared and introduced into hydrate forming apparatus 20 in order to demonstrate the utility of this material. However, while the 1:3 ratio was found to be useful for forming hydrates, other ratios of these two liquids are possible. Approximately 150 grams of the R141B+FC-3283 mixture and 150 grams of an aqueous solution containing 2.54 wt. % of sodium chloride ("NaCl") were introduced into a thermostatically-controlled cell 21 in which the liquid phases could be dispersed by stirring with a vane impeller 22. The hydrate-forming temperature was maintained at 3° C. and cell 21 was nominally operated at atmospheric pressure but was constructed to allow operation at pressures up to about 100 atmospheres. A high pressure gage 23 and safety relief valve 24 were attached to cell 22 during of high pressure operation. Processing temperature was controlled using type T thermocouple 25. Approximately 0.1 gm of solid hydrate produced in a previous experiment was used as seed material to enhance hydrate formation.

Figure 5:
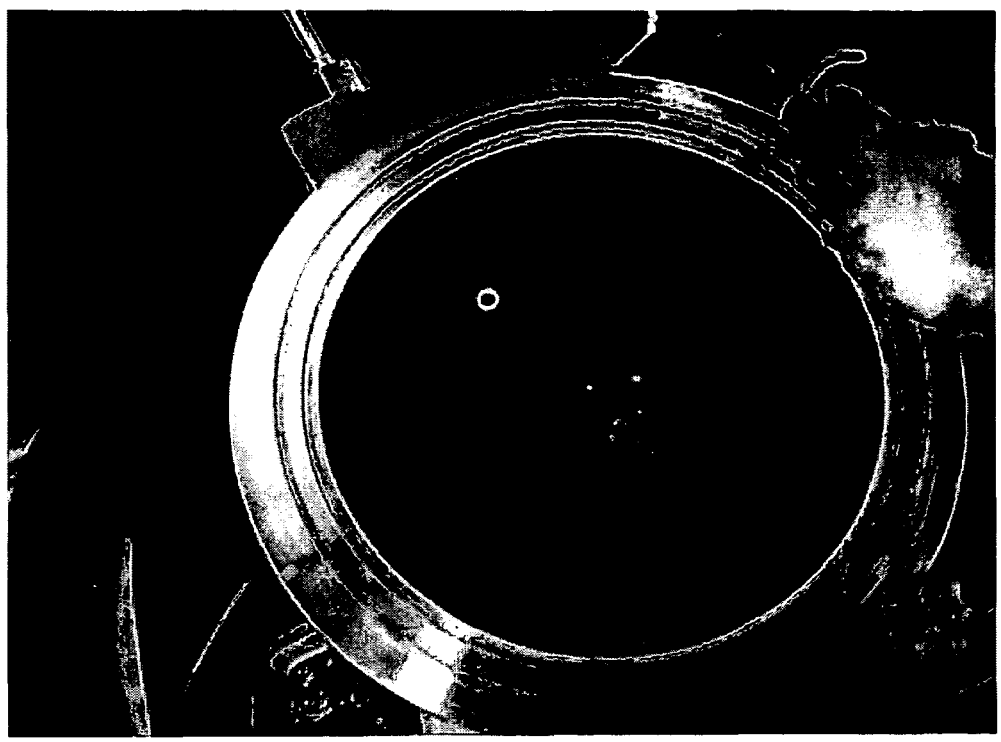
FIG. 5 is a close-up illustration of the pressure chamber used to prepare the clathrate hydrate and shows a quantity of the frozen water-containing hydrate.
Figure 6:
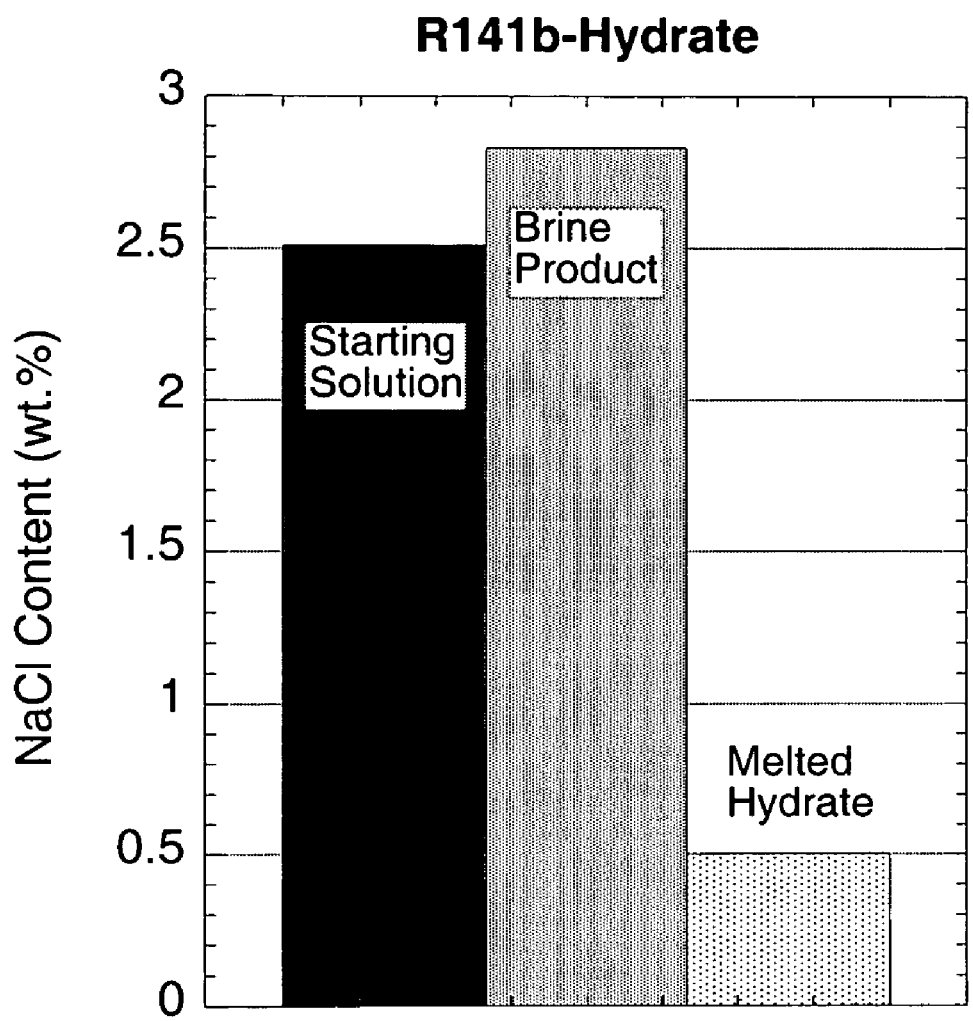
FIG. 6 shows a bar graph depicting the desalination of water using the heat exchange liquid approach.

After several minutes of stirring, the solution was seen to increase in temperature by about 1° C. indicating the formation of solid hydrate crystals. Visual inspection of the cell interior showed the presence of solid hydrate material and further processing was terminated. to Cell 21 was opened to reveal a quantity of frozen water-containing hydrate such as is shown in FIG. 5. An amount of hydrate crystals sufficient for analysis were scooped from the test cell with a spatula in order to determine the extent with which the process achieved desalination. The recovered hydrate slush was partially drained and melted and the salinity of the resulting aqueous "melt" solution was compared to that of both the starting and the residual saline solutions by measuring the refractive index (hereinafter "R.I.") to determine saline content of each. The melted hydrate phase was found to contain 0.49 wt. % NaCl (R.I. 1.33390) compared to 2.54 wt. % NaCl (R.I. 1.33749) in the starting solution and 2.72 wt. % NaCl (R.I. 1.33804) in the brine after the test. This result equates to about an 80% reduction in salt content as compared to the starting solution and is graphically illustrated in FIG. 6.

The results of the analysis of the above test and the analysis results of several additional similar test results are summarized and shown below in TABLE 1.

TABLE 1

| R141B + FC-3283 wt % | Cell Layout | Salinity$_{initial}$ NaCl wt % | Salinity$_{final}$ NaCl wt % | Salinity$_{hydrate}$ NaCl wt % |
|---|---|---|---|---|
| 25 | Stirred | 2.54 | 2.72 | 0.49 |
| 25 | Stirred | 2.64 | 2.95 | |
| 25 | Stirred | 3.69 | 4.43 | |
| 25 | Stirred | 2.51 | 2.83 | 0.50 |
| 25 | Stirred | 2.25 | 2.49 | |
| 14 | Stirred | 6.49 | 7.63 | |
| 11 | Stirred | 4.87 | 5.60 | |
| 19 | Injected | 4.72 | 5.35 | |
| 19 | Injected | 1.83 | 2.27 | |

In addition to methane, other gases that form clathrates or hydrates can be used. Examples of such other gases include ethane, propane, butane, cyclopropane, hydrogen, cyclobutane, 1,1-difluoroethane and mixtures thereof. Similarly, in addition to 1,1-dichloro-1-fluoroethane, there are other liquids that can form clathrates or hydrates that can be used. Examples of such liquids include acetone, 1,4-dioxine, tetrahydrofuran, and mixtures thereof.

Finally, to the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, it should be noted by those skilled in the art that the disclosures herein are exemplary only and that various other alternatives, adaptations, and modifications may be made within the scope of the present invention. Two particular embodiments which are to be considered as falling within the scope of the present invention are electrodialysis and reverse-osmosis water purification methods and devices which utilize the method and coolant solution of the present invention as a pre-treatment step in the process of providing potable water. Accordingly, the present invention is not limited to the specific embodiments as illustrated herein, but is only limited by the following claims.

We claim:

1. A method for providing potable water from a source of polluted or salt-containing water, comprising the steps of:
   (a) forming a coolant solution comprising a hydrate-forming species and a perfluorocarbon heat exchange (HX) liquid compound, wherein both said hydrate-forming species and said HX liquid compound are immiscible in water, wherein the hydrate-forming species is selected to restrict or substantially eliminate the formation of hydrate crystal dendrites, and wherein said hydrate-forming species will form clathrate hydrates within a specific range of temperature and pressure and said HX liquid compound will not form hydrates within said specific range;
   (b) introducing a seed quantity of a solid hydrate into a quantity of said polluted or salt-containing water having a temperature and pressure within said specific range;
   (c) dispersing said coolant solution in said quantity of polluted or salt-containing water while maintaining said temperature and pressure within said specific range forming thereby a clathrate hydrate;

(d) separating and removing said clathrate hydrate from said coolant solution and said polluted or salt-containing water; and (e) melting said clathrate hydrate and separating and recovering a quantity of said coolant solution and a quantity of purified water comprising the clathrate hydrate.

2. The method of claim 1, wherein the said hydrate-forming species is a liquid.

3. The method of claim 2, wherein the hydrate-forming species is selected from the list consisting of a chlorofluorocarbon, a hydrofluorocarbon, a hydrochlorofluorocarbon, and combinations thereof.

4. The method of claim 3, wherein the hydrate-forming species is 1,1-dichloro-1-fluoroethane, acetone, 1,4-dioxine, tetrahydrofuran, or mixtures thereof.

5. The method of claim 2, wherein the hydrate-forming species is 1,1-dichloro-1-fluoroethane.

6. The method of claim 5, wherein the HX liquid compound comprises an electronic fluid having a molecular weight of 521 gm/gm-mole, a density of 1.82 gm/cm$^3$, a refractive index of 1.2813, and a dielectric constant of 1.86.

7. The method of claim 6, wherein the coolant solution comprises about 25% by weight of the 1,1-dichloro-1-fluoroethane and about 75% by weight of the HX liquid compound.

8. The method of claim 1, wherein the said hydrate-forming species is a gas.

9. The method of claim 8, wherein the said gas is selected from the list consisting of carbon dioxide, hydrogen sulfide, hydrogen, methane, ethane, ethylene, propane, butane, cyclopropane, cyclobutane, 1,1-difluoroethane and mixtures thereof.

10. The method of claim 1, wherein the temperature is between about 1° C. to about 5° C. and wherein the pressure is between about 1 atm to about 34 atm.

11. The method of claim 1, wherein the step of melting said clathrate hydrate further comprises recovering the heat of dissociation of said clathrate hydrate in the HX liquid.

12. An electrodialysis process for purifying a supply of polluted or salt-contaminated water comprising the step of pre-treating the supply of polluted or salt-contaminated water by the method of claim 1.

13. A reverse osmosis process for purifying a supply of polluted or salt-contaminated water comprising the step of pre-treating the supply of polluted or salt-contaminated water by the method of claim 1.

* * * * *